United States Patent [19]

Weiss et al.

[11] 3,983,263

[45] Sept. 28, 1976

[54] POWDERED ACRYLIC PAINT COMPOSITION AND METHOD

[75] Inventors: Philip Weiss, Birmingham; Gordon D. Cheever, Rochester, both of Mich.

[73] Assignee: General Motors Corporation, Detroit, Mich.

[22] Filed: June 27, 1974

[21] Appl. No.: 483,689

[52] U.S. Cl. .............................. 427/27; 106/15 FP; 260/23 R; 260/881; 427/27; 427/208; 427/221; 427/234; 427/255; 427/327; 427/388
[51] Int. Cl.² .......................................... B05D 7/00
[58] Field of Search ...................... 260/23 R, 881; 106/15 FP; 427/221, 208, 234, 255, 435, 27

[56] References Cited
UNITED STATES PATENTS

| | | | |
|---|---|---|---|
| 2,179,065 | 11/1939 | Smith | 260/327 |
| 2,925,174 | 2/1960 | Stow | 206/59 |
| 3,855,170 | 12/1974 | Junkin | 260/23 R |

OTHER PUBLICATIONS

Kirk Other, "Encyclopedia of Chem. Tech.," pp. 776 et seq.

Primary Examiner—Lewis T. Jacobs
Assistant Examiner—William E. Parker
Attorney, Agent, or Firm—George A. Grove

[57] ABSTRACT

Certain glycerides are effective flow-promoting agents in powdered acrylic coating formulations. As a powdered acrylic resin coating material is applied by electrostatic sprayer means to a substrate, a rough layer of discrete particles is formed. To produce a commercially acceptable coating, this layer must be fused into a continuous film and induced to flow into a smooth, glossy finish. The subject glycerides, which may be acetylated, promote such flow and produce a surface finish equivalent to that of the conventional acrylic paints which employ an organic solvent vehicle.

7 Claims, No Drawings

POWDERED ACRYLIC PAINT COMPOSITION AND METHOD

BACKGROUND OF THE INVENTION

This invention relates to the use of suitable fatty acid radical-containing glycerides as flow promoting agents in powdered acrylic paint formulations and to a method of coating with such formulations.

For many years, acrylic resin painting processes have employed organic solvent-type vehicles, and the various formulations and spraying techniques have been highly refined. The vehicle provides fluidity, permitting the applied paint droplets to flow into a smooth, continuous film before the vehicle is evaporated. The resultant finishes are of high quality in terms of both appearance and durability.

In view of problems inherent in the use of organic solvents, interest has shifted to dry paint formulations which can be electrostatically sprayed in powder form onto a substrate. A suitable powder coating would then be baked to fuse the layer of discrete particles and induce them to flow into a smooth, glossy surface. However, heretofore such solvent-free coatings have not been observed to flow upon fusion into the smooth, glossy coatings indicative of the prior art acrylic lacquer coatings. At the conclusion of the bake operation, powder coatings are still relatively rough and often display a characteristic "orange peel" appearance. The viscosity of fused prior art powder coatings in the bake operation is relatively high, particularly at low shear rates. The principal flow-inducing force acting on the fused powder coating is surface tension which has proved ineffective in leveling prior art powder coating formulations.

OBJECTS OF THE INVENTION

It is an object of our invention to provide a powdered acrylic coating composition containing a suitable long chain, fatty acid glyceride constituent, which may be acetylated, such that after application of the dry powder and during a subsequent bake cycle the rough layer of particles will fuse and readily flow into a durable and commercially acceptable glossy surface.

It is a further object of our invention to provide a method of coating a substrate employing a dry acrylic powder containing a specific type of long chain, fatty acid containing glyceride flow-inducing constituent, which method produces an improved decorative and durable surface.

SUMMARY OF THE INVENTION

In accordance with a preferred embodiment of our invention, these and other objects are accomplished by the incorporation of the subject glyceride into either a thermoplastic or a thermosetting acrylic coating formulation. A novel powdered coating composition prepared in accordance with the teachings of this invention will contain a suitable acrylic binder or film forming resin, a suitable pigment or combination of pigments, the subject glyceride compound and possibly various other additives to enhance particular properties of the coating. The glyceride is employed at a concentration within the range of, by weight, from 5% to 30% based on the nonpigment components of the coating composition. The acrylic resin-based coating formulation is prepared in the form of a suitable powder which is applied to a substrate by electrostatic paint spraying techniques. The powder coated substrate is then heated to fuse the acrylic resin and other nonpigment constituents and cause them to flow into a continuous, smooth, glossy film.

The flow promoting constituent of the subject acrylic paint composition is predominantly a monoglyceride or a mixture of monoglycerides having the following structural formulas:

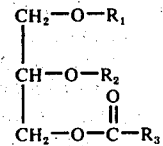

where $R_1$ is either -H or

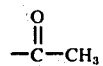

and $R_2$ is -H or

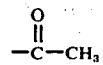

and $R_3$ is a hydrocarbon chain having from 12 to 20 carbon atoms. Typically, the subject flow promoting constituent contains a mixture of monoglycerides differing in the length of the hydrocarbon chain, $R_3$, as well as in the extent of acetylation.

These and other objects and advantages of this invention will be better understood in view of a detailed description thereof which follows, including several specific examples.

DETAILED DESCRIPTION OF THE INVENTION

Efforts to develop commercially acceptable acrylic powder coatings involve both thermoplastic and thermosetting resin systems. The thermoplastic acrylic resins, which offer several advantages over the thermosets, usually contain a clear thermoplastic acrylic binder or film-forming resin, special purpose additives such as cellulose acetate butyrate which increase the film's resistance to cracking or crazing, and the desired pigment formulation. The binder resins are typically a mixture of methacrylate homopolymers and copolymers, with the most predominant monomer units being methyl methacrylate and various isomers of butyl methacrylate.

The subject glyceride compounds have proved effective in a variety of these thermoplastic resins, as illustrated by the following specific examples. The simplest resin was a random copolymer having, by weight, 54% methyl methacrylate and 46% isobutyl methacrylate. Another resin was a composition of, by weight, 60% poly(methyl methacrylate), 30% by weight of a random copolymer having, by weight, 82% methyl methacrylate and 18% isobutyl methacrylate, and 10% of a terpolymer containing, by weight, 81% methyl methacrylate, 18% n-butyl methacrylate and 1% diethyl-aminoethyl methacrylate. The subject glycerides also proved effective with a variety of pigments in these thermoplastic resins, including titanium dioxide, monastral red, monastral blue, carbon black, iron oxide and lead chromate. It is to be understood that the subject glycerides were compatible with all thermoplastic resins that were tested in this investigation.

The subject glycerides are also compatible with and effective in promoting the flow of typical thermoset acrylic resin formulations. The binder resins used in these systems generally contain a random copolymer of the following monomers, methyl methacrylate, butyl methacrylate, 2-hydroxy ethyl acrylate and styrene. The crosslinking agent used with these resins is generally a melamine or a urethane.

The physical and chemical compatibility of all components in the film forming or binder resin is very desirable in this type of optical application because any incompatible resin component will coalesce and form a separate phase causing the optical element to cloud or become opaque. The pigments will, of course, form a separate phase, but the binder resin must be clear and not interfere with the optical properties of the pigment.

We have discovered that the subject monoglycerides are compatible with conventional acrylic paint resins. Furthermore, the monoglyceride constituents have also proved to be compatible with many conventional coating additives, such as cellulose acetate butyrate, inorganic and organic pigments, and plasticizers. This high degree of compatibility allows the glycerides to be readily incorporated into existing formulations.

The subject glyceride compounds may be described by the following structural formula:

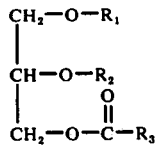

where $R_1$ may be either -H or

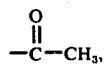

$R_2$ May be -H or

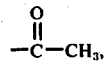

and $R_3$ is a hydrocarbon chain having from 12 to 20 carbon atoms. Preferably, this flow promoting glyceride constituent contains a mixture of such glycerides differing at least in the length of the hydrocarbon chains. In general, the above representative formula describes an acetylated or nonacetylated monoglyceride constituent in which the hydrocarbon chains ($R_3$) of the various molecules are derived from a naturally occurring fatty acid substance and are thus of varying structure.

As indicated above, mixtures of acetylated and/or nonacetylated monoglycerides derived from fatty acids are particularly effective in promoting the flow properties of powdered acrylic coatings. Examples of such mixtures include the following (a) – (d) compositions.

a. The mixture of nonacetylated monoglycerides described by the following general formula:

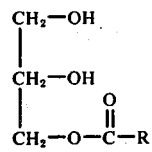

wherein R is any of the hydrocarbon chains derived from the fatty acids found in either fully hydrogenated cottonseed oil or fully hydrogenated lard.

The *Kirk-Othmer Encyclopedia of Chemical Technology*, Volume 8, page 776ff, Second Edition, provides a representative analysis of the fatty acids found in various natural sources and that analysis is hereby incorporated by reference. Cottonseed oil is described as having, by weight, 1% 14 carbon atom fatty acids, 31% 16 carbon atom fatty acids, and 68% 18 carbon atom fatty acids. Lard contains, by weight, 2% 14 carbon atom fatty acids, 29% 16 carbon atom fatty acids, and 69% 18 carbon atom fatty acids.

b. The mixture of monoacetylated monoglycerides described by the general formula:

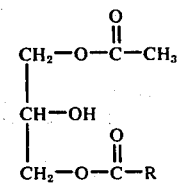

where R is any of the hydrocarbon chains derived from the fatty acids found in either fully hydrogenated cottonseed oil or fully hydrogenated lard.

c. The mixture of diacetylated monoglycerides described by the general formula

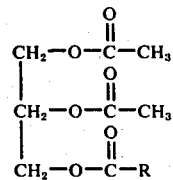

wherein R is any of the hydrocarbon chains derived from the fatty acids found in any of fully hydrogenated cottonseed oil, fully hydrogenated lard, prime steam lard or partially hydrogenated vegetable oil. The *Kirk-Othmer Encyclopedia* which is cited above defines prime steam lard as having, by weight, 3% 14 carbon atom fatty acids, 27% 16 carbon atom fatty acids, 69% 18 carbon atom fatty acids, and 1% 20 carbon atom fatty acids. It should be noted that over 50% by weight of the fatty acids found in prime steam lard are unsaturated.

d. Mixtures of any of the above

It is to be emphasized that the variety of acetylated and nonacetylated glycerides having saturated and unsaturated hydrocarbon chains of varying lengths, which are effective in this application, demonstrate the applicability of the entire class of compounds described by the aforementioned general structural formula.

In a preferred practice of this invention the various ingredients, including the acrylic binder resin, the pigment, the subject monoglyceride and other additives, are blended in solution to insure a thorough dispersion. The solute is then precipitated, dried and ground into a fine powder. Then the powder is electrostatically sprayed onto a suitable substrate and is subsequently baked to fuse the layer of discrete coating particles, and to allow them to flow into a smooth, continuous, decorative film.

The novel powdered acrylic coatings which contain the subject flow promoting agent have a very durable and decorative finish which far surpasses the finishes of prior art acrylic powder coatings. Furthermore, the appearance of the subject coatings is equivalent to that of the conventional acrylic coatings which employ an organic solvent vehicle.

EXAMPLE 1

In this and each of the following examples a commercially available acrylic powder paint formulation was blended with various experimental monoglycerides and electrostatically sprayed onto a suitable substrate for evaluation. The blending was done in solution and it was, therefore, necessary to precipitate, dry and grind the residue to obtain a suitable powder.

The first step in the formulation process was to purify the aforementioned binder resin by dissolving it and the other components except the monoglyceride in a suitable solvent, such as lacquer thinner. Then the resin was precipitated from that solution by adding it dropwise to hexane. The resulting precipitate was filtered and dried. This initial step was taken to remove any undesirable impurities in the commercial paint powder which may have distorted or masked the effect of the later added monoglyceride constituent.

The next step was to dissolve the purified commercial powder and the desired monoglyceride in acetone and to stir. This solution blending operation insured a uniform dispersion of the monoglyceride throughout the coating formulation. The resulting solute was precipitated by adding the solution dropwise onto distilled water. The resultant solids were dried, ground at the temperature of dry ice to a fine powder, again dried, and then sieved to achieve a more uniform particle size. This powder was then electrostatically sprayed onto a smooth, metallic substrate and baked at 350° F. for a period of ten to thirty minutes. The resulting coating was evaluated by the conventional techniques used in the paint industry.

The above experimental blending and powdering procedures were carefully designed to minimize as much as possible the effect of unintentional variations in laboratory technique on the appearance of the final coating.

The baked coating was about 2 mils thick and its appearance or gloss was evaluated with a Hunter Model C-16 multipurpose instrument. This tool measures the amount of light reflected from a standard light source positioned directly above the sample at positions of 20° and 60° from the vertical. These tests are typically used in the paint industry to evaluate coating appearance, and the instrument called a "glossmeter" consists simply of a stand, and standard light source and a light meter.

Our work indicates that the gloss reading, i.e., the amount of light reflected, at the 20° angle is a more critical test than the 60° gloss reading. This conclusion was drawn from the observation that two surfaces may have similar gloss readings at 60°, but the surface with the higher 20° gloss reading will have a better appearance.

To assess the melt flow properties of various experimental coating formulations during the bake cycle, the viscosity of polymer melt samples was measured at 350° F. in a Theta Viscometer. This instrument measures the viscosity at a shear rate in the range of 6 to 12 reciprocal seconds. At such shear rates acrylic polymer melts are known to have near Newtonian flow properties.

To isolate the effect of each of the experimental monoglyceride constituents, a standard coating formulation was prepared with each of the examples. The standard binder formulation for Examples 1, 2 and 3 contained, by weight, 50 parts of a representative thermoplastic acrylic resin, which was a copolymer of methyl methacrylate and isobutyl methacrylate, 25 parts of cellulose acetate butyrate, and 25 parts of an alkyd polymer of coconut oil, which is a conventional plasticizer. Whatever pigment system was being used in the monoglyceride-containing binder, was added to the above standard binder formulation to form the standard powder coating formulation for that particular example. In preparing the standard formulations, great care was taken to duplicate the blending and powdering techniques used in preparing the experimental formulations. The standard formulation for Example 4 is described therein.

The data derived from this example clearly demonstrates that coatings of the monoglyceride containing formulations have a surface which is measurably superior to the standard formulation. In this example the surface appearance of a coating consisting of the standard thermoplastic formulation is compared to the surfaces of formulations containing 12.5% by weight of the alkyd plasticizer and 12.5% by weight of the monoglyceride.

Specifically, the standard formulation which is described above was blended with a pigment containing phthalocyanine green, carbon black and aluminum flake; 6 parts by weight of this pigment composition were added to 100 parts by weight of the aforementioned standard binder resin.

This standard was formulated, powdered, sprayed and fused onto a substrate using the procedures described above, and the resulting surface had a 60° gloss reading of 59 points of gloss and a 20° gloss reading of 18 points of gloss (hereinafter "points"). The melt viscosity of the standard was 1,280 poise. When compared to a solvent-based paint which has a 60° gloss reading of 82 points or above, this formulation was clearly unacceptable, however, it was useful for comparative purposes.

The first experimental monoglyceride resin-containing formulation of this example contained, by weight based on the binder composition, 50% of the copolymer of methyl methacrylate and isobutyl methacrylate, 25% cellulose acetate butyrate, 12.5% of the conventional plasticizer, and 12.5% of a 96% diacetylated monoglyceride having the structural formula:

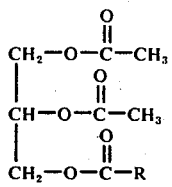

where R represents hydrocarbon chains derived from the combination of fatty acids found in partially hydrogenated vegetable oil. This material is commercially available from Eastman Chemical Products, Inc. under the brand name "Myvacet 9-45". Using the aforementioned formulating, powdering and spraying procedures, the first experimental material produced a finish with a 60° gloss reading of 76 points and a 20° gloss reading of 32.5 points. This formulation had a melt viscosity of 560 poise. These results clearly demonstrate the effectiveness of the monoglyceride component.

The second experimental coating resin was identical to the first, except that the alkyd plasticizer was omitted and the concentration of the monoglyceride was increased to 25%. More specifically, this second experimental formulation contained, by weight, 50% of the acrylic copolymer, 25% of the cellulose acetate butyrate, and 25% of Myvacet 9-45. The pigment concentration and ingredients were not altered, and the same formulating, spraying and testing procedures were followed. This resin had a melt viscosity of only 350 poise as measured on the Theta Viscometer at 350° F., again illustrating the flow promoting properties of the monoglyceride.

EXAMPLE 2

The preparation and evaluation of two formulations containing no pigments are reported in this example. The procedures of previous examples were followed except that a spray technique was substituted for the original drop funnel method of precipitating the powder. The standard formulation consisted of 50% by weight, based on the total binder formulation, of a thermoplastic copolymer of methyl methacrylate and isobutyl methacrylate, 24% of cellulose acetate butyrate, and 26% of the polymeric plasticizer which, as in Example 1, was an alkyd polymer of coconut oil.

The standard was precipitated by spraying from a compressed air, paint spray gun at 20 psi onto the surface of heptane at room temperature. The powder was collected, dried, dissolved in acetone and spray-precipitated onto water. It was then dried, ground at the temperature of dry ice, dried again and sieved to produce a more uniform particle size distribution. The resultant powder was then electrostatically sprayed onto a smooth, metallic substrate and evaluated.

The melt viscosity of this standard formulation was greater than 8,680 poise and the resultant finish had a 20° gloss reading of 1.4 points; both tests indicate very poor flow properties and, therefore, an unacceptable coating formulation.

An experimental formulation was prepared having the same composition as the standard except that the polymeric plasticizer was replaced by an equal amount of a 96% diacetylated monoglyceride having the general formula:

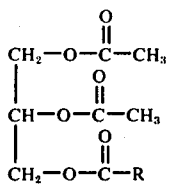

where R is made up of hydrocarbon chains derived from the combination of fatty acids found in prime steam lard. This material is marketed by Eastman Chemical Products, Inc. under the brand name "Myvacet 9-40".

The preparation procedures and spraying techniques were the same as those used with the standard formulation, and the monoglyceride was added when the binder resin was dissolved in acetone. This formulation had a melt viscosity of 754 poise and the resultant coating had a 20° gloss reading of 73.5 points. Here again, the ability of the monoglyceride additive to promote a smooth and decorative surface is apparent.

EXAMPLE 3

The two formulations of this example were prepared using the same procedures as those described in Example 2, except that a beige pigment was added. The pigment consisted of ferrite yellow iron oxide, titanium dioxide and carbon black, and was added at a concentration of 25 parts by weight to each 100 parts by weight of the binder resin formulation. As described in Example 2, the standard binder resin contained 50% of an acrylic copolymer of methyl methacrylate and isobutyl methacrylate, 24% cellulose acetate butyrate, and 26% of the polymeric plasticizer.

The experimental formulation, containing 26% by weight of the monoglyceride, was prepared in the same manner as that described in Example 2 and the monoglyceride was the same as that used in Example 2.

The standard formulation produced a finish with a 20° gloss reading of 55.0 points while the monoglyceride formulation produced a finish with a 20° gloss reading of 72 points, again clearly indicating the useful and marked effect of the monoglyceride additive and its compatibility with several pigments.

EXAMPLE 4

The formulations of this example demonstrate the compatibility and effectiveness of the monoglyceride additive in thermosetting acrylic powder coating resins.

The standard formulation consisted of about 85% of a random copolymer of methyl methacrylate and isobutyl methacrylate, styrene and 2-hydroxy ethyl acrylate, and 15% by weight of a urethane which is a crosslinking agent in this system. This is a typical thermosetting acrylic resin formulation. In this system the hydroxy functionalities on the acrylic copolymer provide the reactive sites for the crosslinking reaction. Amine groups may also be used in place of the hydroxy groups to provide the necessary reactive sites. Likewise, the urethane may be replaced by other crosslinking agents such as the melamines. This standard thermosetting formulation produced a finish with a 20° gloss reading of 74.2 points which is significantly above the readings of the standard thermoplastic resin.

The experimental formulation consisted of the standard resin, which was described above, plus an additional 5% by weight, based on the total binder formulation, of a mixture of diacetylated monoglycerides having the general formula:

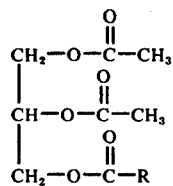

and monoacetylated monoglycerides having the general formula:

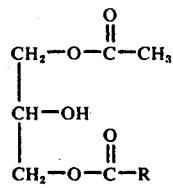

and nonacetylated monoglycerides having the general formula:

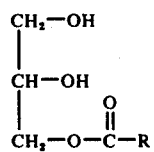

where R is any of the hydrocarbon chain derived from the combination of fatty acids found in any of fully hydrogenated cottonseed oil. This material was about 50% by weight acetylated; it is presently marketed by Eastman Chemical Products, Inc. under the brand name "Myvacet 507".

This experimental formulation was prepared by blending 1,000 parts by weight of the thermosetting binder resin, and 50 parts by weight of the monoglyceride mixture, and 2,500 parts of the solvent, chloroform. Both the monoglyceride and the acrylic resin were dissolved in the chloroform and were thereby thoroughly mixed. The solvent was then removed by a spray drying operation leaving discrete particles. This powder was then electrostatically sprayed onto a substrate for evaluation. The resultant finish had a 20° gloss reading of 79.5 points, which would be acceptable in applications having the most demanding appearance requirements.

In accordance with our invention, a suitable thermoplastic powdered coating formulation may consist of, by weight, from 50 to 70 parts of a suitable acrylic resin, from 0 to 30 parts of a suitable plasticizer, from 15 to 30 parts of an anticracking agent which is typically cellulose acetate butyrate, from 0 to 30 parts of a suitable pigment combination, and from 10 to 30 parts of the subject monoglyceride additive described by the general formula:

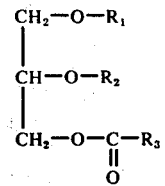

where $R_1$ may be either -H or

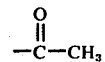

and $R_2$ may be -H or

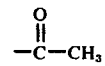

and $R_3$ is a hydrocarbon chain having from 12 to 20 carbon atoms. The preferred thermoplastic binder formulation contains, by weight, 50 parts of the acrylic resin, 25 parts of cellulose acetate butyrate, and 25 parts of a diacetylated monoglyceride wherein the hydrocarbon chain is derived from prime steam lard.

In accordance with our invention, a suitable thermosetting powdered acrylic coating formulation may consist of a thermosetting binder resin which is typically a random copolymer formed by combining, by weight, from 50 to 90 parts of a suitable acrylic monomer such as a methyl methacrylate and/or a butyl methacrylate, from 0 to 25 parts of styrene, from 15 to 25 parts of a hydroxy-containing monomer such as 2-hydroxy-ethyl acrylate, from 0.1 to 1 part of a catalyst such as acrylic acid, and from 20 to 25 parts of a suitable crosslinking agent such as a melamine or urethane. This binder resin is then blended with from 10 to 40 parts by weight of a suitable pigment and from 5 to 30 parts by weight of the subject monoglyceride additive described by the general formula:

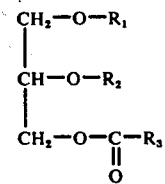

where $R_1$ may be either -H or

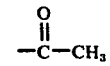

and $R_2$ may be -H or

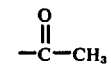

and $R_3$ is a hydrocarbon chain having from 12 to 20 carbon atoms. The preferred thermosetting binder formulation contains 85 parts of a crosslinkable acrylic resin, 15 parts of a urethane cross-linker and 5 parts of a mixture of nonacetylated, monoacetylated and diacetylated monoglycerides, which mixture is about 50% by weight acetylated. The preferred hydrocarbon chain segment of the monoglycerides is derived from fully hydrogenated cottonseed oil.

While our invention has been described in terms of certain preferred embodiments, it will be appreciated that other forms thereof could readily be adapted by one skilled in the art. Therefore, the scope of our invention is not to be limited to the specific embodiments illustrated.

What is claimed is:

1. In an acrylic powder coating formulation containing an acrylic resin binder, the improvement comprising including in said formulation uniformly mixed with said acrylic resin an amount of from 5% to 30% by weight, based on the amount of said resin and any other nonpigment constituents in said formulation, of a flow promoting composition characterized by the following formula:

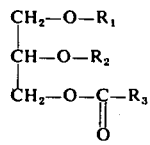

where $R_1$ may be -H or

$R_2$ may be -H or

and $R_3$ is a hydrocarbon chain from 12 to 20 carbon atoms.

2. In an acrylic powder coating formulation containing an acrylic resin binder, the improvement comprising including in said formulation uniformly mixed with said acrylic resin an amount of from 5% to 30% by weight, based on the amount of said resin and any other nonpigment constituents in said formulation, of a flow promoting composition selected from the group consisting of:

A. nonacetylated monoglycerides having the general formula

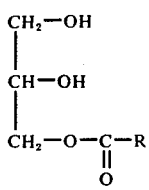

where R is a hydrocarbon chain derived from the combination of fatty acids found in either fully hydrogenated cottonseed oil or fully hydrogenated lard, B. monoacetylated monoglycerides having the general formula

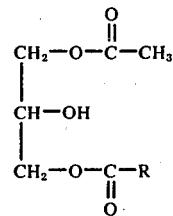

where R is a hydrocarbon chain derived from the combination of fatty acids found in either fully hydrogenated cottonseed oil or fully hydrogenated lard, and C. diacetylated monoglycerides having the general formula

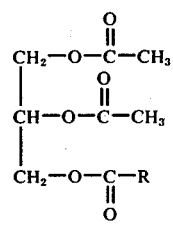

where R is a hydrocarbon chain derived from the combination of fatty acids found in any of fully hydrogenated cottonseed oil, fully hydrogenated lard, prime steam lard or partially hydrogenated vegetable oil.

3. A thermoplastic acrylic powdered coating formulation suitable for deposition on a substrate initially as a layer of discrete particles having the capability of fusing, upon heating, into a continuous film and of flowing into a smooth, decorative surface comprising a uniform dispersion, in dry powdered form, of, by weight:

A. from 10 to 30 parts of a flow promoting composition having the general formula

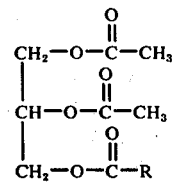

where R is a hydrocarbon chain derived from the combination of fatty acids found in prime steam lard, B. from 15 to 30 parts of an anticracking agent, C. from 50 to 70 parts of a thermoplastic acrylic binder resin, D. From 0 to 30 parts of pigments, and E. from 0 to 30 parts of a plasticizer.

4. A thermosetting acrylic powdered coating formulation suitable for deposition on a substrate initially as a layer of discrete particles having the capability of fusing upon heating into a continuous film and of flowing into a smooth and decorative surface comprising a uniform dispersion, in dry powdered form, of, by weight:

A. from 65 to 140 parts of a thermosetting binder resin,

B. from 0 to 40 parts of pigments, and

C. from 5 to 30 parts of a monoglyceride mixture of 1. diacetylated monoglycerides having the general structural formula

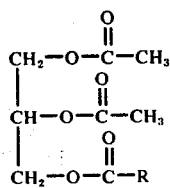

2. the monoacetylated monoglycerides having the general structural formula

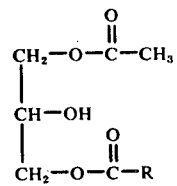

3. nonacetylated monoglycerides having the general structural formula

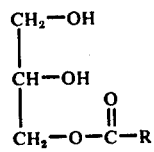

where R is a hydrocarbon chain derived from fully hydrogenated cottonseed oil.

5. A method of forming a decorative and protective coating on a substrate comprising:
A. providing an acrylic powder coating formulation comprising a uniform dispersion, in dry powdered form, of, by weight:
1. from 30 to 70 parts of an acrylic resin,
2. from 0 to 30 parts of pigments,
3. from 5 to 30 parts of monoglycerides having the structural formula

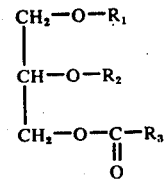

where $R_1$ may be -H or

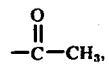

$R_2$ may be -H or

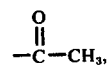

and $R_3$ is a hydrocarbon chain having from 12 to 20 carbon atoms,

B. electrostatically spraying said powdered coating formulation on said substrate thereby forming thereon a coating layer of discrete particles, and
C. baking said coating for ten to thirty minutes at a temperature of from 300° to 375° F., whereupon said particles fuse and flow into a smooth continuous film.

6. A method of forming a decorative and protective coating on a substrate comprising:
A. providing a thermoplastic coating formulation comprising a uniform dispersion, in dry powdered form, of, by weight:
1. from 50 parts to 70 parts of a thermoplastic acrylic resin,
2. from 0 to 30 parts of pigments,
3. from 15 parts to 30 parts of an anticracking agent,
4. from 10 parts to 30 parts of monoglycerides having the general formula

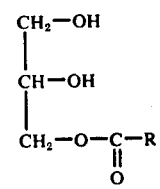

where R is any of the hydrocarbon chains derived from the combination of fatty acids found in either fully hydrogenated cottonseed oil or fully hydrogenated lard, and
5. from 0 to 30 parts of a plasticizer,
B. electrostatically spraying said powdered coating formulation on said substrate, and
C. baking said coated substrate for 10 to 30 minutes at a temperature of from 300° to 375° F.

7. A method of forming a decorative and protective coating on a substrate comprising:
A. providing a thermosetting coating formulation, in dry powdered form, comprising, by weight:
1. from 65 to 145 parts of a thermosetting binder resin,
2. from 5 to 30 parts of a monoglyceride flow control agent selected from the group consisting of
a. diacetylated monoglycerides having the general structural formula

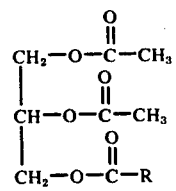

b. the monoacetylated monoglycerides having the general structural formula c. nonacetylated monoglycerides having the general structural formula
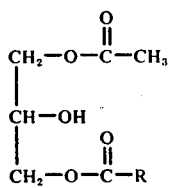
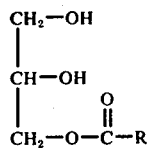
where R is any of the linear hydrocarbon chains derived from fully hydrogenated cottonseed oil, and
3. from 0 to 40 parts pigment,
B. electrostatically spraying said powdered coating formulation on said substrate, and
C. baking said coated substrate for 10 to 30 minutes at a temperature of from 300° to 375° F.
* * * * *